(12) United States Patent
Miyamori et al.

(10) Patent No.: US 7,699,540 B2
(45) Date of Patent: Apr. 20, 2010

(54) OPTICAL FIBER REINFORCEMENT PROCESSING APPARATUS AND OPTICAL FIBER REINFORCEMENT PROCESSING METHOD

(75) Inventors: Makoto Miyamori, Kanagawa (JP); Kazunari Hattori, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1 day.

(21) Appl. No.: 12/084,369

(22) PCT Filed: May 16, 2007

(86) PCT No.: PCT/JP2007/060068

§ 371 (c)(1),
(2), (4) Date: Apr. 30, 2008

(87) PCT Pub. No.: WO2007/132898

PCT Pub. Date: Nov. 22, 2007

(65) Prior Publication Data

US 2009/0052846 A1    Feb. 26, 2009

(30) Foreign Application Priority Data

May 17, 2006    (JP)    .............................. 2006-137912

(51) Int. Cl.
*G02B 6/255* (2006.01)
(52) U.S. Cl. ............................. 385/96; 385/95; 385/99; 385/97; 385/98
(58) Field of Classification Search ............ 385/95, 385/96, 97, 98, 99, 134, 147, 12
See application file for complete search history.

(56) References Cited

U.S. PATENT DOCUMENTS 5,841,204 A * 11/1998 English ..................... 307/117

(Continued)

FOREIGN PATENT DOCUMENTS

JP    2-78942    3/1990    ............... 385/99 X (Continued)

OTHER PUBLICATIONS

Japanese Notification of Reason for Refusal, w/ English translation thereof, issued in Japanese Patent Application No. JP 2006-137912 dated May 12, 2009.

*Primary Examiner*—Brian M Healy
(74) *Attorney, Agent, or Firm*—McDermott Will & Emery LLP (57) ABSTRACT

An optical fiber reinforcement processing apparatus and reinforcement processing method are provided where it is not necessary to dispose a temperature detecting device such as a thermistor, and a heating control in which the detected temperature is not varied, the power consumption is low, and which is accurate is enabled.

An optical fiber reinforcement processing apparatus in which a fusion-spliced portion of an optical fiber is covered by a heat-shrinkable reinforcing sleeve to perform reinforcement has: heating controlling means for performing a heating control on a heater which heats the reinforcing sleeve; and temperature detecting means for detecting a heating temperature of the heater on the basis of a change of the resistance of the heater. The heating control and the temperature detection are performed by controlling time periods of turning on/off a power supply to the heater. The temperature detection is performed by detecting a voltage change Eo of the midpoint of a bridge circuit in which a series circuit of a first fixed resistor R1 and a heater resistor RX, and a series circuit of a second fixed resistor R2 and a third fixed resistor R3 are connected in parallel.

6 Claims, 4 Drawing Sheets

U.S. PATENT DOCUMENTS

| | | | |
|---|---|---|---|
| 7,212,718 B2 * | 5/2007 | Sato | 385/134 |
| 2005/0123253 A1 * | 6/2005 | Sato | 385/99 |
| 2009/0052846 A1 * | 2/2009 | Miyamori et al. | 385/96 |

FOREIGN PATENT DOCUMENTS

| | | | |
|---|---|---|---|
| JP | 2-73602 | 6/1990 | 385/99 X |
| JP | 3-10494 | 1/1991 | 385/99 X |
| JP | 4-24705 | 2/1992 | 385/99 X |
| JP | 5-164933 | 6/1993 | 385/99 X |
| JP | 5-55491 | 7/1993 | 385/99 X |
| JP | 2001-13355 | 1/2001 | 385/99 X |
| JP | 3293594 | 4/2002 | 385/99 X |

* cited by examiner

(PRELIMINARY HEATING IS NOT PERFORMED)

FIG. 3 (B)

(PRELIMINARY HEATING IS PERFORMED)

OPTICAL FIBER REINFORCEMENT PROCESSING APPARATUS AND OPTICAL FIBER REINFORCEMENT PROCESSING METHOD

RELATED APPLICATIONS

This application is the U.S. National Phase under 35 U.S.C. §371 of International Application No. PCT/JP2007/60068, filed on May 16, 2007, which in turn claims the benefit of Japanese Application No. 2006-137912, the disclosures of which Applications are incorporated by reference herein.

TECHNICAL FIELD

The present invention relates to an optical fiber reinforcement processing apparatus in which optical fibers are fusion-spliced to each other by a fusion-splicing apparatus, and thereafter a fusion-spliced portion is reinforced by a reinforcing sleeve, and also to a reinforcement processing method.

BACKGROUND ART

Optical fibers are fusion-spliced to each other by a fusion-splicing apparatus by removing fiber coatings of end portions to be fusion-spliced of the optical fibers, butting end portions of bare glass fibers which are exposed against each other, and heating and fusing the butted end portions to fusion-splice the end portions together. The bare fiber portions which are fusion-spliced to each other are protected by a reinforcing member because the fusion-spliced portions are in a state where the fiber coatings are removed away, and have a low mechanical strength. As the reinforcing member, usually, a reinforcing sleeve is used in which a tensile strength member (also referred to as a reinforcing rod) and a heat-fusible adhesive resin material are housed in a heat-shrinkable tube that is radially shrinkable. The reinforcing sleeve is caused to heat shrink to protect the fusion-spliced portion of the optical fiber.

A usual reinforcement process on a fusion-spliced portion of an optical fiber is performed by a reinforcement processing apparatus comprising a heating heater. A time period required for a work of fusion-splicing optical fibers is 10 to 20 seconds. By contrast, a time period required for a heating process work for reinforcement is 30 to 135 seconds. Even when the fusion-splicing work is rapidly performed, therefore, the subsequent heating process work requires a prolonged time period, and hence the working efficiency of the total fusion-splicing process is hardly improved.

By contrast, for example, Patent Reference 1 discloses a technique in which the heating amount of a heating heater is increased as compared to a usual one, and the temperature rise is suppressed by an air blower disposed below the heater, whereby the heating time period is shortened, and forced cooling is performed by the air blower to shorten the cooling time period, so that the total working time period is shortened.

Patent Reference 2 discloses a technique in which, when the external air temperature is low, a long time period is required for raising the temperature to a predetermined processing temperature, and hence the temperature of a heater and the external air temperature are detected, and, in the case where the external air temperature is low, the heating amount of the heater is increased.

Patent Reference 3 discloses a technique in which, in the case where a reinforcing sleeve is heated by a reinforcement processing apparatus, heating is performed from a middle portion of the sleeve toward both end portions so that voids do not remain inside, and heating at start of a heating process is concentrated to a middle portion of a heater to raise the temperature, thereby shortening the heating time period.

Patent Reference 1: JP-UM-A-4-24705
Patent Reference 2: JP-UM-A-2-73602
Patent Reference 3: Japanese Patent No. 3,293,594

DISCLOSURE OF THE INVENTION

Problems that the Invention is to Solve

In Patent Reference 2, the heating amount of the heater is changed in accordance with the external air temperature. In a temperature environment where the external air temperature is as low as −10° C., for example, the initial temperature is low. Even when the heating amount of the heating heater is increased, therefore, a long time period is required for raising the temperature to the predetermined processing temperature. In the case where a reinforcement process is continuously performed on many optical fibers, the initial temperature of the reinforcement processing apparatus is changed in accordance with the environment and the status of use, and also the difference with the external air temperature is varied. Therefore, it is necessary that the heating temperature of the heater is always monitored, and the heating amount of the heating heater is frequently changed, or the heating time period is changed.

As disclosed in Patent Reference 1, the time periods required for raising and lowering the temperature are shortened by the air blower, or, as disclosed in Patent Reference 3, the heating temperature of the middle portion is set to be slightly higher than the heating temperatures of the end portions, whereby voids are prevented from remaining inside. Also in this case, the temperatures of the middle and end portions of the heater are monitored, and a predetermined heating control is performed.

In a conventional optical fiber reinforcement process, a temperature measurement for the heating control is performed with using a thermistor. The thermistor is attached to a predetermined portion by means of adhesion or the like, and susceptible to be affected by the external environment such as the external air temperature, and the detected temperature may be varied by the attaching state, the degraded state, and the like. Therefore, the accuracy of the heating control is lowered, the quality of the reinforcing apparatus is dispersed, and labor is consumed in calibrating the detected temperature. A heat-transmission time difference between the heater and the thermistor is produced, and the process is not superior in the viewpoint of the responsibility. This causes overshoot of heating, with the result that an excess power is consumed.

The present invention has been conducted in view of the above-discussed circumstances. It is an object of the present invention to provide an optical fiber reinforcement processing apparatus and optical fiber reinforcement processing method where it is not necessary to dispose a temperature detecting device such as a thermistor, and a heating control in which the detected temperature is not varied, and the power consumption is low, and which is accurate is enabled.

Means for Solving the Problems

The optical fiber reinforcement processing apparatus and optical fiber reinforcement processing method of the present invention are an optical fiber reinforcement processing apparatus and reinforcement processing method in which a fusion-spliced portion of an optical fiber is covered by a heat-shrinkable reinforcing sleeve to perform reinforcement, wherein they comprise: heating controlling means for performing a heating control on a heater which heats the reinforcing sleeve; and temperature detecting means for detecting a heating temperature of the heater on the basis of a change of a resistance of the heater. The temperature of the heater which heats the reinforcing sleeve is monitored by the temperature detecting means which detects the temperature on the basis of a change of the resistance, and the reinforcing sleeve is heated at a temperature at which thermal shrinkage occurs.

The heating control and the temperature detection are performed by controlling time periods of turning on/off a power supply to the heater. Furthermore, the temperature detection is performed by detecting a voltage change of a midpoint of a bridge circuit in which a series circuit of a first fixed resistor and a heater resistor, and a series circuit of a second fixed resistor and a third fixed resistor are connected in parallel.

Preferably, the heater is set so that a heating temperature of a middle portion is higher than heating temperatures of end portions, or, before the reinforcing sleeve is heated at the temperature at which thermal shrinkage occurs, the temperature of the heater is monitored, and preliminary heating to a predetermined temperature is performed.

Effects of the Invention

According to the present invention, the heater itself which heats the reinforcing sleeve is used as a temperature detecting device. Therefore, a temperature detecting device such as a thermistor is not necessary, and the number of components can be reduced. Since the heater itself is used as a temperature detecting device, an accurate heating control in which the detected temperature is less varied by the attaching state and the degraded state can be performed, and calibration of the detected temperature can be facilitated. Moreover, the responsibility of the temperature control is improved, so that waste power consumption can be prevented from occurring.

Because of the temperature detection in which variation is reduced, and the accurate heating control, a process of heating the reinforcing sleeve from the middle portion toward the end portions can be stably performed. Furthermore, the heating process by the preliminary heating enables the heating time period in the main heating to be effectively shortened.

DESCRIPTION OF REFERENCE NUMERALS AND SIGNS 1 optical fiber
2 bare glass fiber
3 fusion-spliced portion
4 reinforcing sleeve
5 adhesive resin material
6 reinforcing rod
7 heat-shrinkable tube
10a, 10b, 10c heater
11 heater substrate
12, 12a, 12b, 12c heating conductor
Rx heater resistor
R1 first fixed resistor
R2 second fixed resistor
R3 third fixed resistor
SW1 first switching means
SW2 second switching means
D voltage comparator

BEST MODE FOR CARRYING OUT THE INVENTION

Figure 1:
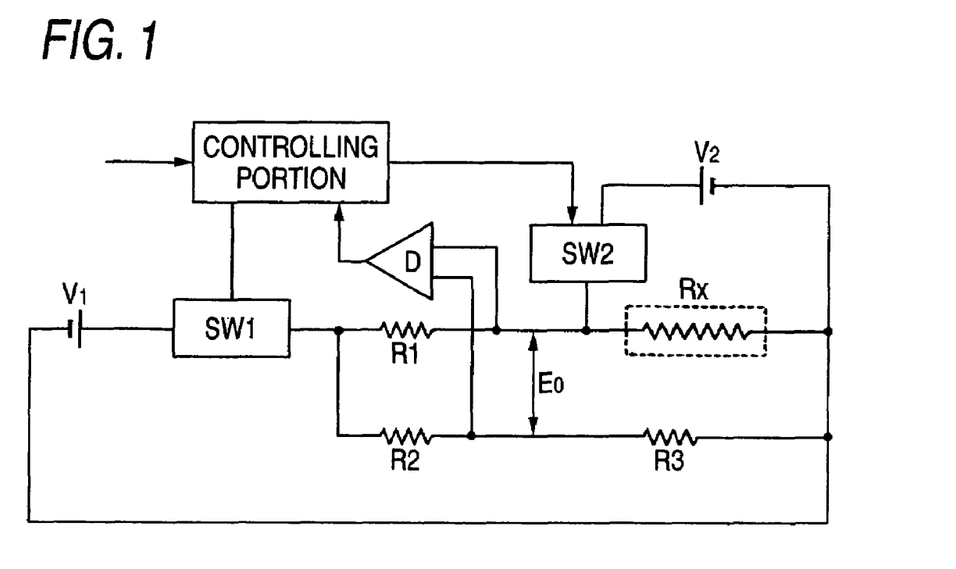
FIG. 1 is a circuit diagram schematically illustrating a heating control of the reinforcement processing apparatus of the present invention.
Figure 2:
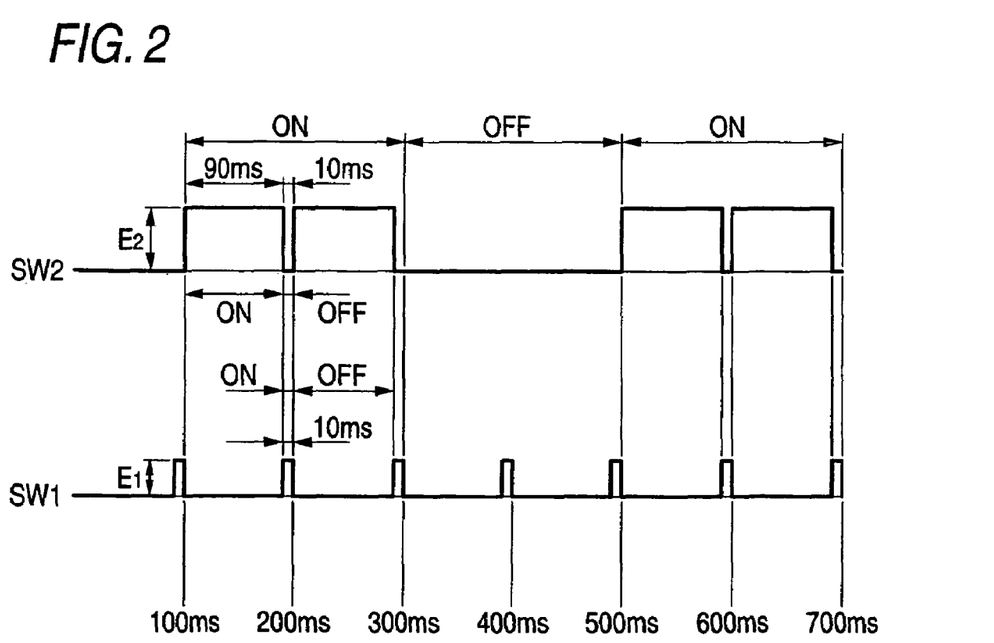
FIG. 2 is a view illustrating a state of power supply to a heater in the present invention.

An embodiment of the invention will be described with reference to the figures. FIG. 1 is a circuit diagram schematically illustrating a heating control of the reinforcement processing apparatus of the present invention, and FIG. 2 is a view illustrating a state of power supply to a heater in the present invention.

A resistor Rx of the heater which is a heating member of the reinforcement processing apparatus of the present invention is connected in series to a first fixed resistor R1, and is incorporated as one resistance element of a bridge circuit in which the series circuit of the first fixed resistor R1 and the resistor Rx is connected in parallel to a series circuit of a second fixed resistor R2 and a third fixed resistor R3. A whole control circuit has first switching means SW1 which controls on/off operations of a first power source $V_1$ in accordance with a control signal from a controlling portion, and second switching means SW2 which controls on/off operations of a second power source $V_2$.

The first switching means SW1 functions as temperature detecting means, and is used for detecting a change of the heater resistor Rx to measure the temperature of the heater. The second switching means SW2 functions as heating controlling means, and is used for supplying a power to the heater resistor Rx to control the heating amount. The on/off control by the first switching means SW1 and the second switching means SW2 may be executed by hardware or software.

The first power source $V_1$ is a voltage which is lower than the second power source $V_2$, and which, when the second power source $V_2$ is about 12 V, for example, is about DC 3.3 V. A load circuit to which the first power source $V_1$ is applied is formed by the bridge circuit in which the series circuit of the first fixed resistor R1 and the heater resistor Rx is connected in parallel to the series circuit of the second fixed resistor R2 and the third fixed resistor R3, and configured so as to function as the temperature detecting means to detect a voltage Eo of the midpoint of the bridge circuit.

When the resistances of the resistors constituting the bridge circuit are in an equilibrium state of R1·R3=Rx·R2, the voltage Eo of the midpoint of the bridge circuit indicates zero. When the temperature of the heater resistor Rx is raised as a result of power supply to change the resistance, the voltage Eo is generated. In the present invention, the heating temperature of the heater resistor Rx is measured by detecting the voltage Eo of the bridge circuit. The heating temperature of the heater may be detected also with using a heat sensitive device such as a thermistor. However, when a change of the heater resistor Rx is detected by a simple bridge circuit, it is possible to detect the heater temperature accurately and surely without using a temperature detecting device such as a thermistor, being affected by the external air temperature, and causing variations due to the attaching state and the degraded state.

FIG. 2 is a view showing an example in which the power supply to the heater resistor Rx is on/off controlled to measure the heating temperature of the heater and adjust the heating amount of the heater.

In the power supply from the first power source $V_1$ by the first switching means SW1, a voltage $E_1$ which is obtained by dividing by the first fixed resistor R1 is applied to the heater resistor Rx. The on/off operations by the first switching means SW1 are, for example, set so that, in a unit of 100 ms, the heater is turned on for 10 ms and turned off for 90 ms. When the heater resistor Rx is changed by heating from the above-mentioned equilibrium state, the voltage Eo corresponding to the resistance change of the heater resistor Rx is generated by the power supply at the midpoint of the bridge circuit, and the heater temperature is measured. The change of the voltage Eo is fed back to the controlling portion by a voltage comparator D.

The measurement of the heater temperature by the first switching means SW1 can be performed also during a non-operation period when the reinforcement process is not conducted, and the heating process by the second switching means SW2. The heater temperature can be measured always or at an arbitrary timing. The measurement of the heater temperature is performed during the short pulse-like time period of 10 ms in the unit of 100 ms. Therefore, the power consumption required for the temperature measurement is very small.

In the heating control by the second switching means SW2, a voltage E2 supplied from the second power source $V_2$ to the heater resistor Rx is on/off controlled. In the second switching means SW2, in the case where the unit of the on/off operations by the first switching means SW1 is 100 ms, the setting is preferably performed in the unit of 100 ms coincident with this. For example, a control in which the on time in one unit time is set to 90 ms and the off time is set to 10 ms, and they are on/off-operated at predetermined unit time periods can be performed. In place of the on/off operations at predetermined unit time periods, the on/off ratio in the one unit time may be changed by, for example, shortening the on time of 90 ms in the one unit time, and lengthening the off time of 10 ms.

In the heating control by the second switching means SW2, the heater may be preliminarily heated to a predetermined temperature before the main heating at the temperature at which thermal shrinkage of the reinforcing sleeve occurs is performed. In the same manner as the main heating, also the temperature of the preliminary heating can be realized by performing a control in which, for example, the power supply from the first power source $V_1$ is on/off-operated at a predetermined unit time period. Preferably, the heating temperature by the preliminary heating is measured by the on/off operations by the above-described first switching means SW1, and set to a temperature which is lower than the temperature where the reinforcing sleeve heat-shrinks, and at which, even when the hand of a person touches the heater, the hand is not burned. In the case where a resin having a fusing temperature of, for example, 80 to 90° C. is used as an adhesive resin material of the reinforcing sleeve, the heating operation is conducted so that the heating temperature is 60 to 80° C.

The power supply voltage $E_1$ due to the first switching means SW1, and the power supply voltage $E_2$ due to the second switching means SW2 are controlled so as not to be simultaneously applied to the heater resistor Rx. In the unit time period of 100 ms, for example, the voltage $E_2$ is applied for 90 ms by the second switching means SW2, and the voltage $E_1$ is applied for 10 ms by the first switching means SW1 as shown in FIG. 2, whereby the voltages are applied so as not to overlap with each other. According to the configuration, the power source voltages can be stabilized, and a stable power supply is enabled. The example in which the controlled unit time period is 100 ms has been described. Alternatively, a longer unit time period may be set depending on the size of the reinforcing sleeve or the like, and in contrast a shorter unit time period may be set so as to perform a more finely control.

Figure 3:
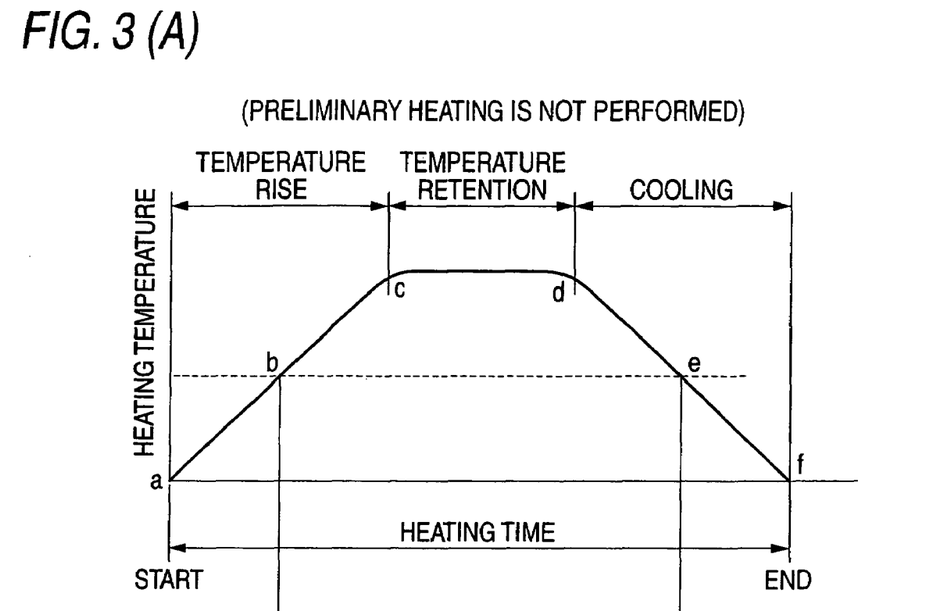
FIG. 3 is a view illustrating states of a heating time period and a heating temperature in the present invention.

FIG. 3 is a view illustrating the states of the heating time period and the heating temperature in the above-described heating control. FIG. 3(A) shows the case of a control in which the preliminary heating is not performed, and FIG. 3(B) shows the case of a control in which the preliminary heating is performed. As shown in FIG. 3(A), in the time period required for the process of heating the reinforcing sleeve, a heating operation for raising the temperature is performed with setting the point a as a starting point and until the point c, then a constant heating temperature is maintained between the points c and d, and a cooling operation is performed between the points d and f.

By contrast, in case of FIG. 3(B) where the preliminary heating is performed, the preliminary heating is performed between the point a in FIG. 3(A) to the point b at a midway in the temperature rise from the point a to the point c. In the time period required for the process of heating the reinforcing sleeve, therefore, the point b is used as a starting point, the heating operation for temperature rise is performed until the point c, and then a constant heating temperature is maintained between the points c and d. In the case where the cooling operation is to be performed, the cooling operation is performed between the point d in FIG. 3(A) and to the point e at a midway in the route from the point d to the point f. However, the cooling operation is ended at the point e, the subsequent cooling operation is not performed, and a preliminary-heating maintained state is set to prepare for the next reinforcement process. As a result, in the heating control in which the preliminary heating is performed, the reinforcement process can be efficiently performed during the heating time period from the point b to the point e which is shortened as compared to that from the point a to the point f in the case where the preliminary heating is not performed.

Figure 4:
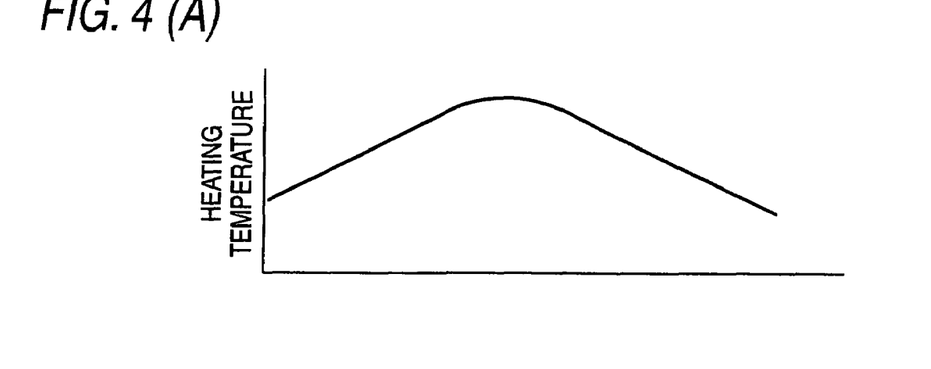
FIG. 4 is a view illustrating a state of thermal shrinkage of a reinforcing sleeve in the present invention.
Figure 5:
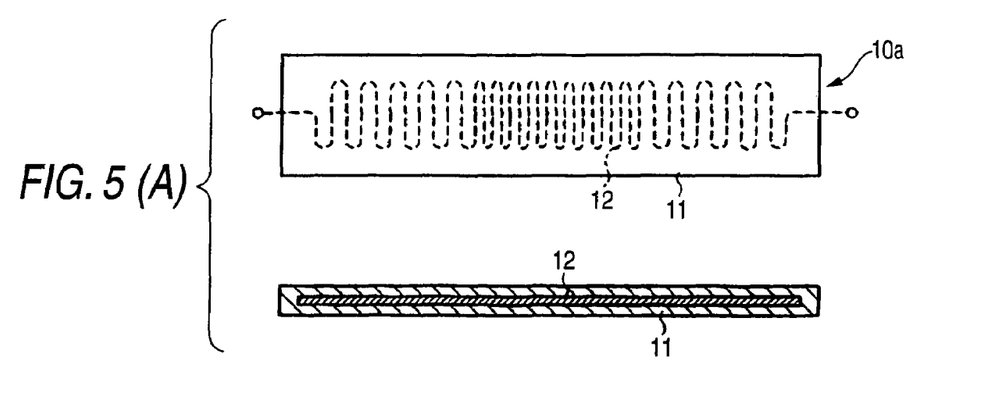
FIG. 5 is a view illustrating a configuration example of the heater used in the present invention.

FIGS. 4 and 5 are views showing an example of a mode of heating the reinforcing sleeve which is executed in the present invention, FIG. 4 is a view illustrating a state of thermal shrinkage of the reinforcing sleeve, and FIG. 5 is a view illustrating a configuration example of the heater. In the figures, 1 denotes an optical fiber, 2 denotes a bare glass fiber, 3 denotes a fusion-spliced portion, 4 denotes a reinforcing sleeve, 5 denotes an adhesive resin material, 6 denotes a reinforcing rod, 7 denotes a heat-shrinkable tube, 10a, 10b, and 10c denote heaters, 11 denotes a heater substrate, and 12, 12a, 12b, and 12c denote heating conductors.

As shown in FIG. 4(A), the heating temperature of the reinforcing sleeve is set so as to attain a chevron temperature distribution in which the temperature of the middle portion of the heater is higher and the temperatures of the end portions are lower. Such a heating mode is disclosed in Patent Reference 3. In addition to the setting in which the heating temperature of the main heating is set to a chevron temperature distribution, the heating temperature of the preliminary heating can be set to a chevron temperature distribution in which the temperature of the middle portion is higher. Therefore, the start of thermal shrinkage of the middle portion of the reinforcing sleeve can be hastened, and the heating time period can be further shortened.

FIGS. 4(B) to 4(D) are views illustrating the progress state of the reinforcement process of the optical fiber by heating of the reinforcing sleeve 4. In a pair of optical fibers 1 which are fusion-spliced to each other, as shown in FIG. 4(B), the fusion-spliced portion 3 and the vicinity thereof are in a state where fiber coatings are removed away and the bare glass fibers 2 are exposed, and, immediately after the fusion-splicing, are hence covered by the reinforcing sleeve 4. For example, the reinforcing sleeve 4 is configured by hosing the tube-like heat-fusible adhesive resin material 5 and the reinforcing rod 6 in the heat-shrinkable tube 7. The reinforcing sleeve 4 is put on so that the bare fibers 2 are positioned in a middle portion of the reinforcing sleeve. Then, the reinforcing sleeve is placed on a heating plate (not shown) of the reinforcement processing apparatus.

The temperature of the middle portion of the heater is high. In the reinforcing sleeve 4, therefore, the adhesive resin material 5 in the middle portion first begins to fuse as shown in FIG. 4(C), and then the heat-shrinkable tube 7 in the middle portion heat-shrinks, so that heat fusion and heat shrink progress so as to push the adhesive resin material 5 from the middle portion toward the end portions. Therefore, the adhesive resin material 5 fills the periphery of the bare fibers 2 without leaving voids in the fusing adhesive resin material 5. As shown in FIG. 4(D), finally, integration including a part of the fiber cover is conducted by the adhesive resin material 5, and the reinforcement process is performed so as to close the both ends of the heat-shrinkable tube 7.

As the heater which raises the heating temperature of the middle portion, for example, configurations such as shown in FIG. 5 are used. The heater 10a shown in FIG. 5(A) has a configuration in which the heating conductor 12 is embedded in the plate-like heater substrate 11 made of a ceramic or the like, and the middle portion of the heating conductor 12 is formed more densely than the end portions so that the heating amount of the middle portion is larger than that of the end portions. When the power for the preliminary heating and the main heating is supplied to the heater, the heating temperature exhibits the chevron shape such as shown in FIG. 4(A).

The heater 10b shown in FIG. 5(B) is an example in which two heating conductors, or the heating conductor 12a that heats the middle portion, and the heating conductor 12b that heats the whole length of the heater are embedded in the plate-like heater substrate 11 made of a ceramic or the like, while the conductors are stacked and electrically insulated from each other. The power supplies to the heating conductors 12a, 12b are independently controlled, so that, for example, the power supply in the preliminary heating is performed only on the heating conductor 12a for the middle portion, and that in the main heating is performed on the heating conductors 12a, 12b, thereby obtaining a chevron temperature distribution such as shown in FIG. 4(A). In the main heating, the heating control may be performed so that the heating conductor 12a for the middle portion is turned off in mid-course.

The heater 10c shown in FIG. 5(C) is an example in which the heating conductor 12a that heats only the middle portion, and the heating conductors 12c which heat only the end portions are combined in a series-like manner and embedded in the plate-like heater substrate 11 made of a ceramic or the like. A switchable circuit configuration is employed in which the power supplies to the heating conductors 12a, 12c are independently controlled, so that, for example, the power supply in the preliminary heating is performed only on the heating conductor 12a for the middle portion, and that in the main heating is performed on the heating conductors 12a, 12c. The heating amounts of the heating conductor 12a for the middle portion and the heating conductors 12c may be changed in accordance with the densities of the heating conductors, or executed by a power supply control, thereby obtaining a chevron temperature distribution such as shown in FIG. 4(A).

Although the invention has been described in detail and with reference to the specific embodiment, it is obvious to those skilled in the art that various modifications and variations are possible without departing the spirit and scope of the invention.

The present application is based on Japanese Patent Application (No. 2006-137912) filed May 17, 2006, and its disclosure is incorporated herein by reference.

INDUSTRIAL APPLICABILITY

As described above, in the optical fiber reinforcement processing apparatus and optical fiber reinforcement processing method of the invention, the heater itself which heats the reinforcing sleeve is used as a temperature detecting device, and hence a temperature detecting device such as a thermistor is not necessary, so that the number of components can be reduced. Since the heater itself is used as a temperature detecting device, an accurate heating control in which the detected temperature is less varied by the attaching state and the degraded state can be performed, and calibration of the detected temperature can be facilitated. Moreover, the present invention has an effect that waste power consumption can be prevented from occurring by the improved responsibility of the temperature control, and is useful as an optical fiber reinforcement processing apparatus or the like in which optical fibers are fusion-spliced to each other by a fusion-splicing apparatus, and thereafter a fusion-spliced portion is reinforced by a reinforcing sleeve.

The invention claimed is:

1. An optical fiber reinforcement processing apparatus in which a fusion-spliced portion of an optical fiber is covered by a heat-shrinkable reinforcing sleeve to perform reinforcement, said apparatus comprising:
   a heating controlling unit for performing a heating control on a heater which heats said reinforcing sleeve; and
   a temperature detecting unit for detecting a heating temperature of said heater on the basis of a change of a resistance of said heater,
   wherein the apparatus is configured so that, before said reinforcing sleeve is heated at the temperature at which thermal shrinkage occurs, the temperature of said heater is monitored by said temperature detecting unit, and said heater is preliminarily heated to a predetermined temperature.

2. An optical fiber reinforcement processing apparatus according to claim 1, wherein said heating controlling unit controls time periods of turning on/off a power supply to said heater.

3. An optical fiber reinforcement processing apparatus according to claim 1, wherein said temperature detecting unit comprises a bridge circuit in which a series circuit of a first fixed resistor and a heater resistor, and a series circuit of a second fixed resistor and a third fixed resistor are connected in parallel, and detects a voltage of a midpoint of said bridge circuit.

4. An optical fiber reinforcement processing apparatus according to claim 3, wherein a power supply to said heater, and a power supply to said bridge circuit are alternately performed.

5. An optical fiber reinforcement processing apparatus according to claim 4, wherein said heater is set so that a heating temperature of a middle portion is higher than heating temperatures of end portions.

6. A reinforcement processing method in which a fusion-spliced portion of an optical fiber is covered by a heat-shrinkable reinforcing sleeve to perform reinforcement, wherein:
a temperature of a heater which heats said reinforcing sleeve is monitored by a temperature detecting unit for performing detection the temperature of the heater on the basis of a change of a resistance, and said reinforcing sleeve is heated at a temperature at which thermal shrinkage occurs, and before said reinforcing sleeve is heated at the temperature at which thermal shrinkage occurs, the temperature of said heater is monitored by said temperature detecting unit, and said heater is preliminarily heated to a predetermined temperature.

* * * * *